United States Patent

Raue et al.

[11] 3,956,264
[45] May 11, 1976

[54] BASIC AZO DYESTUFFS HAVING INDOLYL-METHYLENEAMINO SUBSTITUENT IN THE DIAZO COMPONENT

[75] Inventors: Roderich Raue; Hans-Peter Kühlthau, both of Leverkusen, Germany

[73] Assignee: Bayer Aktiengesellschaft, Leverkusen, Germany

[22] Filed: July 13, 1973

[21] Appl. No.: 378,809

[30] Foreign Application Priority Data
July 13, 1972   Germany............................ 2234468

[52] U.S. Cl............................ 260/155; 260/146 R; 260/146 D; 260/154; 260/157; 260/158; 260/164; 260/165; 260/205; 260/206; 260/207; 260/207.1; 260/326.16
[51] Int. Cl.$^2$......................................... C09B 43/00
[58] Field of Search................ 260/155, 146 R, 164, 260/165

[56] References Cited
FOREIGN PATENTS OR APPLICATIONS
697,445   11/1964   Canada............................. 260/155

*Primary Examiner*—Charles F. Warren
*Attorney, Agent, or Firm*—Plumley & Tyner

[57] ABSTRACT

Basic azo dyestuffs of the formula

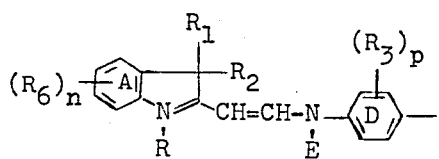

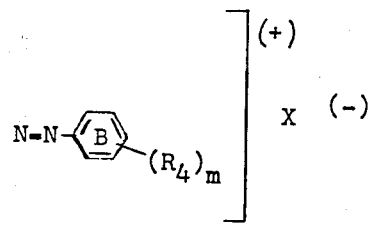

wherein the radicals have the below mentioned meaning, are suitable for dyeing and printing of natural and synthetic materials, particularly of polyacrylnitrile, copolymers of acrylonitrile with other vinyl compounds, of acid modified polyesters and acid modified polyamides.

8 Claims, No Drawings

BASIC AZO DYESTUFFS HAVING INDOLYL-METHYLENEAMINO SUBSTITUENT IN THE DIAZO COMPONENT

The invention relates to basic dyestuffs of the formula

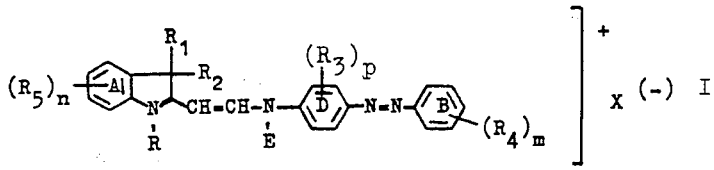

wherein
R denotes hydrogen, alkyl, aryl, or aralkyl,
$R_1$ denotes alkyl, aralkyl or cycloalkyl and
$R_2$ denotes alkyl, aralkyl or cycloalkyl,
$R_1$ and $R_2$ can together form a cycloalkyl ring,
$R_3$ denotes a non-ionic substituent,
$R_4$ denotes a non-ionic substituent or a carboxyl group,
$R_5$ denotes a non-ionic substituent or a carboxyl group,
$m$ denotes the numbers 0, 1, 2 or 3,
$n$ denotes the numbers 0, 1, 2 or 3,
$p$ denotes the numbers 0, 1, 2 or 3,
E denotes hydrogen or a two-membered or three-membered chain, linked to D adjacent to the nitrogen, which can be saturated or partially saturated and can carry non-ionic substituents and/or a fused carbocyclic ring and $X^{(-)}$ denotes an anion.

This invention furthermore relates to mixtures of the dyestuffs I, their manufacture and use for dyeing and printing natural and synthetic materials. The rings A, B and D can be fused with further rings. The cyclic and acyclic radicals can contain further non-ionic substituents and/or carboxyl groups.

Examples of suitable substituents of the rings A and B are: Halogen, alkyl, cycloalkyl, aralkyl, hydroxyl, alkoxy, aryloxy, aralkoxy, nitro, alkoxycarbonyl, aralkoxycarbonyl, carboxyl, nitrile, acyl, acylamino, amino, carbamoyl, N-alkyl-carbamoyl, N,N-dialkyl-carbamoyl, N-alkyl-N-aryl-carbamoyl, sulphamoyl, N-alkyl-sulphamoyl, N,N-dialkyl-sulphamoyl, alkylsulphonyl, arylsulphonyl, trifluoromethyl or arylazo.

The substituents present in the same ring can be identical or different.

The ring A or B for example forms, with the fused rings, a naphthalene, tetrahydronaphthalene, dibenzofurane or carbazole system.

Examples of suitable substituents of the ring D are halogen, alkyl and alkoxy.

By an alkyl radical there is understood a saturated or unsaturated, optionally substituted aliphatic hydrocarbon radical of, preferably, 1–6 C atoms, such as methyl, trifluoromethyl, ethyl, chloroethyl, bromoethyl, hydroxyethyl, methoxyethyl, cyanoethyl, acetoxyethyl, aminocarbonylethyl, i-propyl, n-butyl, i-butyl, t-butyl, i-amyl, allyl, methallyl, γ-chloroallyl or propargyl.

Examples of possible aralkyl radicals are: Phenylmethyl, phenylethyl, phenylpropyl-(2,2) and optionally their derivatives substituted in the phenyl nucleus.

As cycloalkyl, cyclohexyl is of particular importance.

Aryl preferably represents phenyl and naphthyl and their derivatives such as 4-methylphenyl, 2-methylphenyl, 4-chlorophenyl, 2-chlorophenyl and 2-methyl-4-chlorophenyl.

Examples of aryloxy radicals are: Phenoxy and naphthoxy and their derivatives substituted in the aromatic ring.

Suitable aralkoxy radicals are, for example, phenylmethoxy, phenylethoxy, phenylprop-(2,2)-oxy and optionally their derivatives substituted in the phenyl nucleus.

Examples of the carboxylic acid aralkyl ester substituents are carbobenzoxy, carbo-α-phenylethoxy, carbo-β-phenylethoxy, carbo-γ-phenyl-n-propoxy and their derivatives substituted in the phenyl nucleus.

A carboxylic acid aryl ester is, for example, the carboxylic acid phenyl ester.

An aryloxyalkyl substituent is, for example, the phenoxymethyl radical optionally substituted in the phenyl nucleus.

Non-ionic substituents in the sense of the present invention are the non-dissociating substituents customary in dyestuff chemistry, such as fluorine, chlorine or bromine; alkyl groups, especially straight-chain or branched alkyl radicals with 1–6 C atoms; aralkyl radicals; alkenyl radicals; aryl radicals; alkoxy radicals, especially alkoxy radicals with 1–4 C atoms; aralkoxy radicals; aryloxy radicals and alkylthio radicals, preferably alkylthio radicals with 1–3 C atoms; aralkylthio radicals; arylthio radicals; nitro; nitrile; alkoxycarbonyl, preferably having an alkoxy radical with 1–4 C atoms; the formyl radical; alkylcarbonyl radicals, especially those with an alkyl group with 1–4 C atoms; arylcarbonyl; aralkylcarbonyl radicals; alkoxycarbonyloxy radicals, preferably with an alkyl group with 1–4 C atoms; alkylcarbonylamino radicals, preferably with an alkyl group with 1–4 C atoms and arylcarbonylamino radicals; alkylsulphonylamino radicals, preferably with an alkyl group with 1–3 C atoms; arylsulphonylamino groups; ureido, N-aryl-ureido or N-alkyl-ureido, aryloxycarbonylamino, alkoxycarbonylamino, carbamoyl, N-alkylcarbamoyl, N,N-dialkylcarbamoyl and N-alkyl-N-aryl-carbamoyl radicals; sulphamoyl radicals; N-alkylsulphamoyl radicals, N,N-dialkyl-sulphamoyl radicals, alkylsulphonyl radicals; alkenylsulphonyl or aralkylsulphonyl radicals, preferably with 1–4 C atoms present in the alkyl radicals mentioned; arylsulphonyl, carboxylic acid alkyl ester, carboxylic acid aryl ester, sulphonic acid alkyl ester and sulphonic acid aryl ester groups and arylazo radicals.

Possible anionic radicals $X^{(-)}$ are the organic and inorganic anions customary for cationic dyestuffs.

Examples of inorganic anions are fluoride, chloride, bromide and iodide, perchlorate, hydroxyl, and radicals of acids containing S, such as bisulphate, sulphate, disulphate and aminosulphate; radicals of nitrogen-oxygen acids, such as nitrate; radicals of oxygen acids of phosphorus, such as dihydrogen phosphate, hydrogen phosphate, phosphate and metaphosphate; radicals of carbonic acid, such as bicarbonate and carbonate; further anions of oxygen acids and complex acids, such as methosulphate, ethosulphate, hexafluosilicate, cyanate, thiocyanate, ferrocyanide, ferricyanide, trichlorozincate and tetrachlorozincate, tribromozincate and tetrabromozincate, stannate, borate, divanadate, tetravanadate, molybdate, tungstate, chromate, bichromate and tetrafluoborate, as well as anions of esters of boric acid, such as of the glycerine ester of boric acid, and of esters of phosphoric acid, such as of methylphosphate.

Examples of organic anions are anions of saturated or unsaturated aliphatic, cycloaliphatic, aromatic and heterocyclic carboxylic acids and sulphonic acids, such as radicals of acetic acid, chloroacetic acid, cyanoacetic acid, hydroxyacetic acid, aminoacetic acid, methylaminoacetic acid, aminoethylsulphonic acid, methylaminoethylsulphonic acid, propionic acid, n-butyric acid, i-butyric acid, 2-methyl-butyric acid, 2-ethyl-butyric acid, dichloroacetic acid, trichloroacetic acid, trifluoroacetic acid, 2-chloropropionic acid, 3-chloropropionic acid, 2-chlorobutyric acid, 2-hydroxy-propionic acid, 3-hydroxypropionic acid, O-ethyl-glycollic acid, thioglycollic acid, glyceric acid, malic acid, dodecyl-tetraethylene glycol-ether-propionic acid, 3-(nonyloxy)-propionic acid, 3-(isotridecyloxy)-propionic acid, 3-(isotridecyloxy)-diethylene glycol-ether-propionic acid, the ether-propionic acid of an alcohol mixture with 6–10 carbon atoms, thioacetic acid, 6-benzoylamino-2-chlorocaproic acid, nonylphenol-tetraethylene glycol-ether-propionic acid, nonylphenol-diethylene glycol-ether-propionic acid, dodecyl-tetraethylene glycol-ether-propionic acid, phenoxyacetic acid, nonylphenoxyacetic acid, n-valeric acid, i-valeric acid, 2,2,2-trimethylacetic acid, n-caproic acid, 2-ethyl-n-caproic acid, stearic acid, oleic acid, ricinoleic acid, palmitic acid, n-pelargonic acid, lauric acid, a mixture of aliphatic carboxylic acids with 9 to 11 carbon atoms (Versatic Acid 911 from SHELL), a mixture of aliphatic carboxylic acids with 15 to 19 carbon atoms (Versatic Acid 1519 from SHELL), coconut fatty acid first runnings, undecanecarboxylic acid, n-tridecanecarboxylic acid and a coconut fatty acid mixture; acrylic acid, methacrylic acid, crotonic acid, propargylic acid, oxalic acid, malonic acid, succinic acid, glutaric acid, adipic acid, pimelic acid, suberic acid, azelaic acid, the isomer mixture of 2,2,4- and 2,4,4-trimethyladipic acid, sebacic acid, isosebacic acid (isomer mixture), tartaric acid, citric acid, glyoxylic acid, dimethyl-ether-$\alpha,\alpha'$-dicarboxylic acid, methylene-bis-thioglycollic acid, dimethyl sulphide-$\alpha,\alpha'$-dicarboxylic acid, 2,2'-dithio-di-n-propionic acid, fumaric acid, maleic acid, itaconic acid, ethylene-bis-iminoacetic acid, nitrilosulphonic acid, methanesulphonic acid, ethanesulphonic acid, chloromethanesulphonic acid, 2-chloroethanesulphonic acid and 2-hydroxyethanesulphonic acid, and Mersolat, that is to say, $C_8$-$C_{15}$ paraffinsulphonic acid obtained by chlorosulphonation of paraffin oil.

Suitable anions of cycloaliphatic carboxylic acids are, for example, the anions of cyclohexanecarboxylic acid and cyclohexene-3-carboxylic acid and anions of aliphatic monocarboxylic acids are, for example, anions of phenylacetic acid, 4-methylphenylacetic acid and mandelic acid.

Examples of suitable anions of aromatic carboxylic acids are the anions of benzoic acid, 2-methylbenzoic acid, 3-methylbenzoic acid, 4-methylbenzoic acid, 4-tert.-butylbenzoic acid, 2-bromobenzoic acid, 2-chlorobenzoic acid, 3-chlorobenzoic acid, 4-chlorobenzoic acid, 2,4-dichlorobenzoic acid, 2,5-dichlorobenzoic acid, 2-nitrobenzoic acid, 3-nitrobenzoic acid, 4-nitrobenzoic acid, 2-chloro-4-nitrobenzoic acid, 6-chloro-3-nitrobenzoic acid, 2,4-dinitrobenzoic acid, 3,4-dinitrobenzoic acid, 3,5-dinitrobenzoic acid, 2-hydroxybenzoic acid, 3-hydroxybenzoic acid, 4-hydroxybenzoic acid, 2-mercaptobenzoic acid, 4-nitro-3-methylbenzoic acid, 4-aminobenzoic acid, 5-nitro-2-hydroxybenzoic acid, 3-nitro-2-hydroxybenzoic acid, 4-methoxybenzoic acid, 3-nitro-4-methoxybenzoic acid, 4-chloro-3-hydroxybenzoic acid, 3-chloro-4-hydroxybenzoic acid, 5-chloro-2-hydroxy-3-methylbenzoic acid, 4-ethylmercapto-2-chlorobenzoic acid, 2-hydroxy-3-methylbenzoic acid, 6-hydroxy-3-methylbenzoic acid, 2-hydroxy-4-methylbenzoic acid, 6-hydroxy-2,4-dimethyl-benzoic acid, 6-hydroxy-3-tert.-butylbenzoic acid, phthalic acid, tetrachlorophthalic acid, 4-hydroxyphthalic acid, 4-methoxyphthalic acid, isophthalic acid, 4-chloroisophthalic acid, 5-nitro-isophthalic acid, terephthalic acid, nitroterephthalic acid and diphenyl-3,4-carboxylic acid, o-vanillic acid, 3-sulphobenzoic acid, benzene-1,2,4,5-tetracarboxylic acid, naphthalene-1,4,5,8-tetracarboxylic acid, biphenyl-4-carboxylic acid, abietic acid, phthalic acid mono-n-butyl ester, terephthalic acid monomethyl ester, 3-hydroxy-5,6,7,8-tetrahydronaphthalene-2-carboxylic acid, 2-hydroxy-1-naphthionic acid and anthraquinone-2-carboxylic acid.

Examples of suitable anions of heterocyclic carboxylic acids are the anions of pyromucic acid, dehydromucic acid and indolyl-3-acetic acid.

Examples of suitable anions of aromatic sulphonic acids are the anions of benzenesulphonic acid, benzene-1,3-disulphonic acid, 4-chlorobenzenesulphonic acid, 3-nitrobenzenesulphonic acid, 6-chloro-3-nitrobenzenesulphonic acid, toluene-4-sulphonic acid, toluene-2-sulphonic acid, toluene-$\omega$-sulphonic acid, 2-chlorotoluene-4-sulphonic acid, 2-hydroxybenzenesulphonic acid, n-dodecylbenzenesulphonic acid, 1,2,3,4-tetrahydronaphthalene-6-sulphonic acid, naphthalene-1-sulphonic acid, naphthalene-1,4-or -1,5-disulphonic acid, naphthalene-1,3,5-sulphonic acid, 1-naphthol-2-sulphonic acid, 5-nitronaphthalene-2-sulphonic acid, 8-aminonaphthalene-1-sulphonic acid, stilbene-2,2'-disulphonic acid and biphenyl-2-sulphonic acid.

A suitable anion of heterocyclic sulphonic acids is, for example, the anion of quinoline-5-sulphonic acid.

Further possibilities are the anions of arylsulphinic, arylphosphonic and arylphosphonous acids, such as benzenesulphinic acid and benzenephosphonic acid.

Colourless anions are preferred. Preferred anions for dyeing from an aqueous medium are those which increase the solubility of the dyestuff in water, for example the formate, acetate or lactate anion or an anion of an aliphatic dicarboxylic acid such as of succinic acid, glutaric acid, adipic acid, pimelic acid, suberic acid, maleic acid or itaconic acid. Anions which assist the solubility of the dyestuff in organic solvents or at least do not influence it adversely are frequently also preferred for dyeing from organic solvents.

The anion is generally determined by the manufacturing process and by the purification of the crude dyestuff which may have been carried out. In general, the dyestuffs are in the form of halides (especially chlorides or bromides) or methosulphates, ethosulphates, sulphates, benzenesulphates or toluenesulphates or as acetates. An exchange of dyestuff anions by other dyestuff anions can be carried out by treating the basic dyestuff with acid-binding agents such as sodium carbonate, potassium carbonate, ammonium carbonate, magnesium carbonate, sodium hydroxide, potassium hydroxide, ammonia and silver oxide, optionally in an aqueous medium, whereby the dyestuff-onium base (or the carbinol base) is produced, and treating the latter with anion-donating agents.

Interesting dyestuffs are those of the general formula

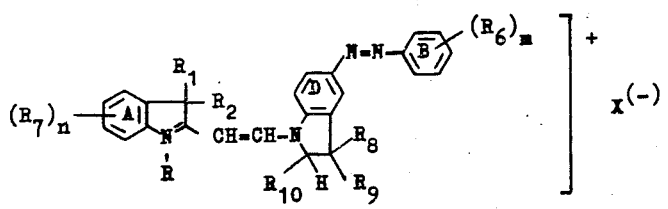

wherein $R, R_1, R_2, A, B, D, m, n$ and $X^{(-)}$ have the above-mentioned meaning and $R_6$ represents halogen, alkyl, cycloalkyl, aralkyl, hydroxyl, alkoxy, aryloxy, aralkoxy, nitro, alkoxycarbonyl, aralkoxycarbonyl, nitrile, acyl, acylamino, amino, carbamoyl, N-alkyl-carbamoyl, N,N-dialkyl-carbamoyl, N-alkyl-N-aryl-carbamoyl, sulphamoyl, N-alkyl-sulphamoyl, N,N-dialkyl-sulphamoyl, alkylsulphonyl, arylsulphonyl, trifluoromethyl or arylazo, $R_7$ represents halogen, alkyl, cycloalkyl, aralkyl, alkoxy, aryloxy, aralkoxy, nitro, alkoxycarbonyl, aralkoxycarbonyl, carboxyl, nitrile, acyl, acylamino, amino, carbamoyl, N-alkyl-carbamoyl, N,N-dialkyl-carbamoyl, N-alkyl-N-aryl-carbamoyl, sulphamoyl, N-alkyl-sulphamoyl, N,N-dialkyl-sulphamoyl, alkylsulphonyl, arylsulphonyl or trifluoromethyl, $R_8$ represents hydrogen, alkyl, aralkyl or cycloalkyl, $R_9$ represents hydrogen, alkyl, aralkyl or cycloalkyl and $R_{10}$ represents hydrogen or alkyl and $R_9$ together with $R_{10}$ can form a saturated or partly saturated carbocyclic ring.

Particularly valuable dyestuffs are those of the general formula

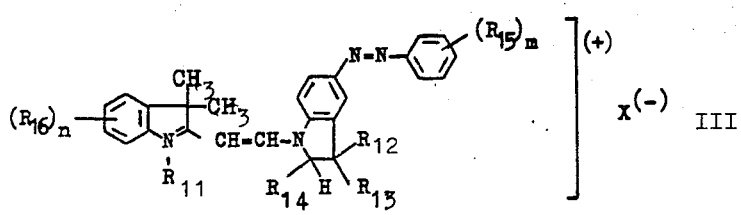

wherein $R_{11}$ denotes ethyl, n-propyl, i-propyl, n-butyl, $\beta$-chloroethyl, $\beta$-hydroxyethyl, $\beta$-cyanoethyl, $\beta$-methoxyethyl, $\beta$-bromoethyl, $\beta$-acetoxyethyl, allyl, benzyl and preferably methyl, $R_{12}$ denotes hydrogen or methyl, $R_{13}$ denotes hydrogen or methyl and $R_{14}$ denotes methyl, and

II $R_{14}$ together with $R_{13}$ can represent a n-butylene-1,4 radical if $R_{12}$ represents hydrogen, $R_{15}$ denotes fluorine, chlorine, bromine, $C_1$-$C_4$-alkyl, cyclohexyl, hydroxyl, methoxy, ethoxy, phenoxy, benzyloxy, nitro, nitrile, acetylamino, carbamoyl, sulphamoyl, methylsulphonyl or trifluoromethyl, $R_{16}$ denotes fluorine, chlorine, bromine, $C_1$-$C_4$-alkyl, cyclohexyl, benzyl, methoxy, ethoxy, phenoxy, benzyloxy, nitro, methoxycarbonyl, benzyloxycarbonyl, carboxyl, nitrile, acetylamino, amino, carbamoyl, sulphamoyl, methylsulphonyl or trifluoromethyl, $m$ denotes the numbers 1, 2, 3 or especially 0, $n$ denotes the numbers 1, 2, 3 or especially 0 and $X^{(-)}$ denotes an anion.

Further interesting dyestuffs are those of the general formula

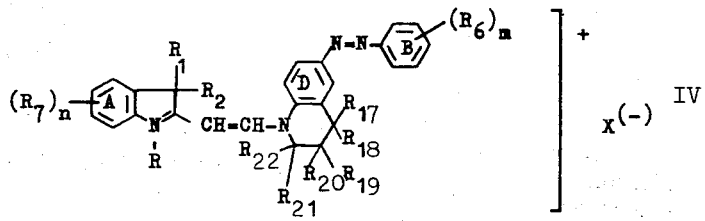

wherein $R, R_1, R_2, R_6, R_7, m, n, X^{(-)}, A, B$ and $D$ have the abovementioned meaning and $R_{17}$ represents hydrogen, hydroxyl, alkyl, alkoxy or halogen, $R_{18}$ represents hydrogen or alkyl, $R_{19}$ represents hydrogen, hydroxyl, alkyl or alkoxy, $R_{20}$ represents hydrogen or alkyl, $R_{21}$ represents hydrogen, hydroxyl, alkyl, alkoxy or halogen and $R_{22}$ represents hydrogen or alkyl or $R_{18}$ and $R_{20}$ together represent a direct bond.

Amongst these dyestuffs, those of the general formula

[Structure V shown: indoline-based cation with hydrazone linkage to phenyl group bearing $(R_{15})_m$, substituents $R_{16}$, $R_{11}$, $R_{23}$, $R_{24}$, $R_{25}$, charge $(+)$ with counterion $X^{(-)}$]

wherein
$R_{11}$, $R_{15}$, $R_{16}$, $m$, $n$ and $X^{(-)}$ have the meaning indicated in the formula III and
$R_{23}$ denotes hydrogen or methyl,
$R_{24}$ denotes hydrogen or methyl and
$R_{25}$ denotes hydrogen or methyl should be singled out particularly.

The dyestuffs of the formula I are manufactured by condensation of aldehydes or their functional derivates, of the formula

[Structure VI: $(R_5)_n$—A l—indoline with N—R, substituents $R_1$, $R_2$, and CH—CHO group]

with compounds of the formula

[Structure VII: $HN(E)$—D—$(R_3)_p$—N=N—B—$(R_4)_m$]

in a manner which is in itself known.
In the formulae VI and VIII
R, $R_1$, $R_2$, $R_3$, $R_4$, $R_5$, A, B, D, E, $m$, $n$ and $p$ have the meaning indicated in the formula I.

The condensation can be carried out by stirring the solution or suspension of equimolar amounts of the compounds VI and VII, in a solvent such as, say, acetonitrile, methanol, ethanol, isopropanol, toluene, xylene, chlorobenzene or o-dichlorobenzene, with acid condensation agents such as, say, hydrochloric acid, phosphorous oxychloride, phosphorus pentoxide, zinc chloride, aluminium chloride, tin chloride, sulphuric acid, phosphoric acid, polyphosphoric acid or their mixtures, at 10° – 120°C, preferably 20° – 60°C.

Condensation can also be carried out without solvents in an organic or inorganic acid or in their mixtures with water. For example, aqueous mineral acids such as sulphuric acid, phosphoric acid or hydrochloric acid are suitable. Fatty acids such as formic acid, acetic acid, propionic acid, butyric acid and their mixtures with one another and with water are also suitable.

Examples of suitable functional aldehyde derivatives are azomethines and their salts, hydrazones, oximes, acetyls, hydrates, ammoniates, aminals or bisulphite adducts. A particular embodiment of the process according to the invention is characterised in that the aldehydes of the formula VI, in the form of their enamines, as first produced in the Vilsmeier reaction, of the formula

[Structure VIII: $(R_5)_n$—A l—indoline with N—R, substituents $R_1$, $R_2$, and CH—CH=N with $R_{26}$, $R_{27}$ groups] + $Cl^{(-)}$ wherein
R, $R_1$, $R_2$, $R_5$, A and n have the meaning indicated in the case of the formula I and
$R_{26}$ represents $C_1$-$C_4$-alkyl or phenyl and
$R_{27}$ represents $C_1$-$C_4$-alkyl are employed.

Examples of suitable aldehydes of the formula VI are: 1,3,3-Trimethyl-2-methylene-2,3-dihydroindol-ω-aldehyde, 1,3,3,5-tetramethyl-2-methylene-2,3-dihydroindol-ω-aldehyde, 1,3,3-trimethyl-5-chloro-2-methylene-2,3-dihydroindol-ω-aldehyde, 1,3,3-trimethyl-5-methoxy-2-methylene-2,3-dihydroindol-ω-aldehyde, 1,3,3-trimethyl-5-carbomethoxy-2-methylene-2,3-dihydroindol-ω-aldehyde, 1,3,3-trimethyl-5-carbethoxy-2-methylene-2,3-dihydroindol-ω-aldehyde, 1,3,3-trimethyl-5-cyclohexyl-2-methylene-2,3-dihydroindol-ω-aldehyde, 1,3,3-trimethyl-5-benzyl-2-methylene-2,3-dihydroindol-ω-aldehyde, 1,3,3-trimethyl-5-nitro-2-methylene-2,3-dihydroindol-ω-aldehyde, 1,3,3-trimethyl-7-methyl-2-methylene-2,3-dihydroindol-ω-aldehyde, 1,3,3-trimethyl-5-trifluoromethyl-2-methylene-2,3-dihydroindol-ω-aldehyde, 1,3,3-trimethyl-7-methoxy-2-methylene-2,3-dihydroindol-ω-aldehyde, 1-ethyl-3,3-dimethyl-2-methylene-2,3-dihydroindol-ω-aldehyde, 1-ethyl-3,3,5-trimethyl-2-methylene-2,3-dihydroindol-ω-aldehyde, 1,3,3,-trimethyl-4-chloro-7-methoxy-2-methylene-2,3-dihydroindol-ω-aldehyde, 1,3,3-trimethyl-4,6-dicarbomethoxy-2-methylene-2,3-dihydroindol-ω-aldehyde, 1,3,3-trimethyl-4,5-dichloro-7-methoxy-2-methylene-2,3-dihydroindol-ω-aldehyde, 1,3,3-trimethyl-5-chloro-4,7-dimethoxy-2-methylene-2,3-dihydroindol-ω-aldehyde, 1,3,3,4,5,7-hexamethyl-2-methylene-2,3-dihydroindol-ω-aldehyde, 1,3,3,4,6,7,-hexamethyl-2-methylene-2,3-dihydroindol-ω-aldehyde, 1-ethyl-3,3-dimethyl-5-chloro-2-methylene-2,3-dihydroindol-ω-aldehyde, 1-ethyl-3,3-dimethyl-5-methoxy-2-methylene-2,3-dihydroindol-ω-aldehyde, 1-ethyl-3,3-dimethyl-5-carbomethoxy-2-methylene-2,3-dihydroindol-ω-aldehyde, 1-ethyl-3,3-dimethyl-5-carbethoxy-2-methylene-2,3-dihydroindol-ω-aldehyde, 1-ethyl-3,3,7-trimethyl-5-cyclohexyl-2-methylene-2,3-dihydroindol-ω-aldehyde, 1-ethyl-3,3-dimethyl-5-benzyl-2-methylene-2,3-dihydroindol-ω-aldehyde, 1-ethyl-3,3-dimethyl-5-nitro-2-methylene-2,3-dihydroindol-ω-aldehyde, 1-benzyl-3,3-dimethyl-2-methylene-2,3-dihydroindol-ω-aldehyde, 1-phenyl-3,3-dimethyl-2-methylene-2,3-dihydroindol-ω-aldehyde, 1,3,3-trimethyl-5-benzyloxy-2-methylene-2,3-dihydroindol-ω-aldehyde, 1-ethyl-3,3-dimethyl-5-benzyloxy-2-methylene-2,3-dihydroindol-ω-aldehyde, 1,3,3-trimethyl-7-benzyl-2-methylene-2,3-dihydroindol-ω-aldehyde, 1,3,3-trimethyl-4-benzyloxy-2-methylene-2,3-dihydroindol-ω-aldehyde, 1,3,3-trimethyl-6-benzyloxy-2-methylene-2,3-dihydroindol-ω-aldehyde, 1,3,3-trimethyl-7-benzyloxy-2-methylene-2,3-dihydroindol-ω-aldehyde, 1,3,3-trimethyl-7-chloro-2-methylene-2,3-dihydroindol-ω-aldehyde, 1,3,3-trimethyl-5-(4'-methylbenzyloxy)-2-methylene-2,3-dihydroindol-ω-aldehyde, 1,3,3-trimethyl-5-(2'-chlorobenzyloxy)-2-methylene-2,3-dihydroindol-ω-aldehyde, 1,3,3-trimethyl-7-(4'-chlorobenzyloxy)-2-methylene-2,3-dihydroindol-ω-aldehyde, 1,3,3-trimethyl-5-methyl-7-benzyloxy-2-methylene-2,3-dihydroindol-ω-aldehyde, 1,3,3-trimethyl-4-methoxy-5-benzyloxy-2-methylene-2,3-dihydroindol-ω-aldehyde, 1,3,3-trimethyl-6-methoxy-5-benzyloxy-2-methylene-2,3-dihydroindol-ω-aldehyde, 1,3,3-trimethyl-5-methyl-4-benzyloxy-2-methylene-2,3-dihydroindol-ω-aldehyde, 1,3,3-trimethyl-5-methyl-6-benzyloxy-2-methylene-2,3-dihydroindol-ω-aldehyde, 1,3,3-trimethyl-7-(4'-methylbenzyloxy)-2-methylene-2,3-dihydroindol-ω-aldehyde, 1,3,3-trimethyl-7-(2'-chloro-benzyloxy)-2-methylene-2,3-dihydroindol-ω-aldehyde, 1,3,3-trimethyl-5-benzyloxy-7-methyl-2-methylene-2,3-dihydroindol-ω-aldehyde, 1,3,3-trimethyl-5-methyl-7-(4'-methylbenzyloxy)-2-methylene-2,3-dihydroindol-ω-aldehyde, 1,3,3-trimethyl-5-phenoxy-2-methylene-2,3-dihydroindol-ω-aldehyde, 1,3,3-trimethyl-7-phenoxy-2-methylene-2,3-dihydroindol-ω-aldehyde, 1,3,3-trimethyl-5-(4'-methylphenoxy)-2-methylene-2,3-dihydroindol-ω-aldehyde, 1,3,3-trimethyl-5-(4'-methoxyphenoxy)-2-methylene-2,3-dihydroindol-ω-aldehyde, 1,3,3-trimethyl-7-(4'-methoxyphenoxy)-2-methylene-2,3-dihydroindol-ω-aldehyde, 1,3,3-trimethyl-5-(4'-chlorophenoxy)-2-methylene-2,3-dihydroindol-ω-aldehyde, 1,3,3-trimethyl-7-(3'-methylphenoxy)-2-methylene-2,3-dihydroindol-ω-aldehyde, 1,3,3-trimethyl-5-(3'-methoxyphenoxy)-2-methylene-2,3-dihydroindol-ω-aldehyde, 1,3,3-trimethyl-5-α-naphthyloxy-2-methylene-2,3-dihydroindol-ω-aldehyde, 1,3,3-trimethyl-5-(4'-ethylphenoxy)-2-methylene-2,3-dihydroindol-ω-aldehyde, 1,3,3-trimethyl-5-carbobenzoxy-2-methylene-2,3-dihydroindol-ω-aldehyde, 1,3,3-trimethyl-5-carbo-β-phenylethoxy-2-methylene-2,3-dihydroindol-ω-aldehyde, 1,3,3-trimethyl-5-carbo-α-phenyl-ethoxy-2-methylene-2,3-dihydroindol-ω-aldehyde, 1,3,3-trimethyl-5-carbo-γ-phenylpropoxy-2-methylene-2,3-dihydroindol-ω-aldehyde, 1,3,3-trimethyl-6,7-benzo-2-methylene-2,3-dihydroindol-ω-aldehyde, 1,3,3-trimethyl-6,7-benzo-2-methylene-2,3,3,3',4',5',6'-hexahydroindol-ω-aldehyde, 1,3,3-trimethyl-5-fluoro-2-methylene-2,3-dihydroindol-ω-aldehyde, 1,3,3-trimethyl-5-ethoxy-2-methylene-2,3-dihydroindol-ω-aldehyde, 1,3,3-trimethyl-7-ethoxy-2-methylene-2,3-dihydroindol-ω-aldehyde, 1,3,3-trimethyl-5-cyano-2-methylene-2,3-dihydroindol-ω -aldehyde, 1,3,3-trimethyl-5-acetylamino-2-methylene-2,3-dihydroindol-ω-aldehyde, 1,3,3-trimethyl-5-methylsulphonyl-2-methylene-2,3-dihydroindol-ω-aldehyde, 1,3,3-trimethyl-5-phenylsulphonyl-2-methylene-2,3-dihydroindol-ω-aldehyde, 1,3-dimethyl-3-ethyl-2-methylene-2,3-dihydroindol-ω-aldehyde, 1,3,3-trimethyl-5-sulphonamido-2-methylene-2,3-dihydroindol-ω-aldehyde, 1,3,3-trimethyl-5-carbonamido-2-methylene-2,3-dihydroindol-ω-aldehyde, 1,3,3-trimethyl-5-carboxylic acid N-ethylanilide-2-methylene-2,3-dihydroindol-ω-aldehyde, 1,3,3-trimethyl-7-ethyl-2-methylene-2,3-dihydroindol-ω-aldehyde and 1,3,3-trimethyl-5-chloro-7-methoxy-2-methylene-2,3-dihydroindol-ω-aldehyde.

Azo compounds of the formula VII are obtained by diazotising amines of the formula

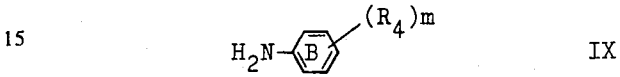

wherein

R₄, B and *m* have the abovementioned meaning and coupling to compounds of the formula

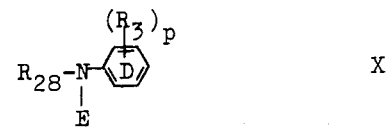

wherein

D, E, *p* and R₃ have the abovementioned meaning and

R₂₈ represents hydrogen or a protective group which is customary in coupling to secondary aromatic amines, anad optionally subsequently splitting off the protective group by saponification.

Suitable azo compounds of the formula VII are: 4-aminoazobenzene, 2-methyl-4-aminoazobenzene, 2-methoxy-4-aminoazobenzene, 2-ethoxy-4-aminoazobenzene, 2,4'-dimethoxy-4-aminoazobenzene, 2-methoxy-4'-methyl-4-aminoazonbenzene, 2-methoxy-4'-chloro-4-aminoazobenzene, 2,4'-dimethyl-4-aminozaobenzene, 2-methyl-4'-chloro-4-aminoazobenzene, 2-methyl-3'-methoxy-4-aminoazobenzene, 2-methyl-2'-methoxy-4-aminoazobenzene, 2,3'-dimethyl-4-aminoazobenzene, 2,2'-dimethyl-4-aminoazobenzene, 2-methyl-3'-chloro-4-aminoazobenzene, 2-methyl-2'-chloro-4-aminoazobenzene, 2-methoxy-3'-methyl-4-aminoazobenzene, 2-methoxy-2'-methyl-4-aminoazobenzene, 2,3'-dimethoxy-4-aminoazobenzene, 2,2'-dimethoxy-4-aminoazobenzene, 2-methoxy-3'-chloro-4-aminoazobenzene, 2-methoxy-2'-chloro-4-aminoazobenzene, 2-ethoxy-3'-methyl-4-aminoazobenzene, 2-ethoxy-2'-methyl-4-aminoazobenzene, 2,3'-diethoxy-4-aminoazobenzene, 2,2'-diethoxy-4-aminoazobenzene, 2-ethoxy-4'-methoxy-4-aminoazobenzene, 2-ethoxy-3'-methoxy-4-aminoazobenzene, 2-ethoxy-2'-methoxy-4-aminoazobenzene, 2-ethoxy-4'-chloro-4-aminoazobenzene, 2-ethoxy-3'-chloro-4-aminoazobenzene and 2-ethoxy-2'-chloro-4-aminoazobenzene.

Further azo compounds of the formula VII are obtained by coupling to secondary heterocyclic amines, if appropriate after introducing a suitable protective group, for example the methanesulphonic acid group, which is again split off by saponification after coupling. Examples of suitable heterocyclic amines are: 2,3,3-Trimethylindoline, 1,2,3,4, 4a, 9a-hexahydrocarbazole, 1,2,3,4-tetrahydroquinoline, 1,2,3,4-tetrahydroquinoxaline, 2,3-dihydro-4H-benzoxazine(1,4), 2,2,4-trimethyl-1,2,3,4-tetrahydroquinoline, 2,2,4-trimethyl-1,2-dihydroquinoline, 2-methylindoline, 2,3,3,6,7-pentamethylindoline, 2,3,3,4,6-pentamethylindoline, mixture of 2,3,3,4-tetramethylindoline and 2,3,3,6-tetramethylindoline, mixture of 2,3,3-trimethyl-4-trifluoromethylindoline and 2,3,3-trimethyl-6-trifluoromethylindoline, 2,3,3,4,6,7-hexamethylindoline, 3-hydroxy-7,8-benzo-1,2,3,4-tetrahydroquinoline and 3-hydroxy-1,2,3,4-tetrahydroquinoline.

Examples of suitable amines of the formula IX are: 4-Aminodiphenyl-ether, 4-amino-4'-methyl-diphenyl-ether, 4-amino-4'-ethyldiphenyl-ether, 4-amino-4'-tertiary-butyldiphenyl-ether, 4-amino-4'-cyclohexyl-diphenyl-ether, 4-amino-2'-methyldiphenyl-ether, 4-amino-3'-methyldiphenyl-ether, 4-amino-4'-methoxy-diphenyl-ether, 3,4-dimethoxyaniline, 2-chloro-4-amino-anisole, 2,4,5-trimethylaniline, 2,3,5-trimethylaniline, 5-amino-2-acetylaminoanisole, 6-amino-3-methoxy-toluene, 3,4-dicyanoaniline, p-sulphanilic acid amide, 4-aminobenzamide, 4-chloroaniline, 4-fluoroaniline, 1,2,3,4-tetrahydro-5-amino-naphthalene, 4-amino-2,5-diethoxy-benzoic acid anilide, 4-amino-2-methyl-5-methoxybenzanilide, 4-cyclohexylaniline, 2,4-diethoxyaniline, 2-aminonaphthalene, 4-amino-3'-methoxy-diphenyl-ether, 4-amino-4'-ethoxy-diphenyl-ether, 4-amino-4'-4'-acetylamino-diphenyl-ether, 4-amino-4'-hydroxy-diphenyl-ether, 4-amino-4'-nitrodiphenylether, 4-amino-4'-chlorodiphenyl-ether, 4-amino-2'-chlorodiphenyl-ether, 4-amino-3'-chlorodiphenyl-ether, 4-aminophenyl-α-naphthyl-ether, 4-aminophenyl-β-naphthyl-ether, 4-amino-2', 3',5'-trimethyldiphenyl-ether, 4-aminophenylbenzyl-ether, 3-aminophenylbenzyl-ether, 2-amino-phenylbenzyl-ether, 2-amino-diphenyl-ether, 4-aminophenyl-p-methylbenzyl-ether, 4-amino-phenyl-p-chlorobenzyl-ether, 4-aminophenyl-o-chlorobenzyl-ether, 4-aminophenyl-m, p-dichlorobenzyl-ether, 4-aminophenyl-2',4',5'-trichlorobenzyl-ether, 3-aminophenyl-p-methylbenzyl-ether, 3-aminophenyl-p-chlorobenzyl-ether, 3-aminophenyl-o-chlorobenzyl-ether, 3-aminophenyl-m, p-dichlorobenzyl-ether, 3-aminophenyl-2',4',5'-trichlorobenzyl-ether, 2-aminophenyl-p-methylbenzyl-ether, 2-aminophenyl-p-chlorobenzyl-ether, 2-aminophenyl-m, p-dichlorobenzyl-ether, 2-aminophenyl-2',4',5'-trichlorobenzyl-ether, 4-amino-2-methyl-phenyl-benzyl-ether, 5-amino-2-methyl-phenyl-benzyl-ether, 2-amino-5-methyl-phenyl-benzyl-ether, 4-amino-2-methoxy-phenyl-benzyl-ether, 4-amino-3-methoxy-phenyl-benzyl-ether, 3-amino-3-methyl-phenyl-benzyl-ether, 4-amino-3-chloro-phenyl-benzyl-ether, 4-amino-2-chloro-phenyl-benzyl-ether, 4-amino-2-methyl-phenyl-p-methylbenzyl-ether, 5-amino-2-methyl-phenyl-m, p-dichlorobenzyl-ether, 2-amino-5-methyl-phenyl-p-chlorobenzyl-ether, 4-amino-2-methoxy-phenyl-p-methylbenzyl-ether, 4-amino-3-methyl-phenyl)-2',4',5'-trichlorobenzyl-ether, aniline, p-toluidine, m-toluidine, o-anisidine, m-anisidine, p-anisidine, p-phenetidine, o-phenetidine, 4-dodecyloxyaniline, 4-aminoacetanilide, N-benzoyl-p-phenylenediamine, 2,4-dimethoxyaniline, 2,5-dimethoxyaniline, p-tert.-butylaniline, o-toluidine, 2,6-dimethylaniline, 4-aminobenzoic acid methyl ester, 2-chloroaniline, 3-chloroaniline 2,4,5-trichloroaniline, 2-fluoroaniline, 2-chloro-5-methylaniline, 2-chloro-6-methylaniline, 3-chloro-2-methylaniline, 5-chloro-2-methylaniline, 3-chloro-4-methylaniline, 4-chloro-3-methylaniline, 2,4-dichloro-5-methylaniline, 3-trifluoromethyl-aniline, 2-chloro-5-trifluoromethylaniline, 2-nitroaniline, 2-methyl-3-nitroaniline, 2-methyl-5-nitroaniline, 2-methyl-4-nitroaniline, 2-nitro-4-methoxyaniline, 4-nitro-2-methoxyaniline, 2-nitro-4-chloroaniline, 4-nitro-2-chloroaniline, 4-nitro-3-chloroaniline, 4-nitro-2-bromoaniline, 4-nitro-2-methoxy-5-methylaniline, 4-chloro-2,5-dimethoxyaniline, 4-nitro-2,5-dimethoxyaniline, 4-nitro-5-chloro-2-methylaniline, 4-nitro-2,6-dichloro-aniline, 4-nitro-2,5-dichloro-aniline, 2-cyano-5-chloroaniline, 4-cyano-2,5-dichloroaniline, 2-cyano-4-nitroaniline, 2-ethylsulphonyl-5-trifluoromethylaniline, 2-methylsulphonyl-4-nitroaniline, 3-hydroxy-4-chloroaniline, 2-hydroxy-4-nitroaniline, 4-aminoazobenzene, 4-aminodibenzofurane, 2-aminodibenzofurane, 9-ethyl-3-aminocarbazole, 6-methyl-2-(4-amino-phenyl)-benzothiazole, 4,6-dimethyl-2-[4-amino-3-methyl-phenyl]-benzothiazole, and 6-amino-2-methyl-benzothiazole.

A further process for the manufacture of dyestuffs of the formula I consists of condensing N-formyl derivatives of the formula

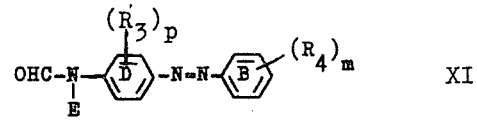

wherein
R$_3$, R$_4$, m, p, B, D and E have the abovementioned meaning with methyleneindolines of the formula

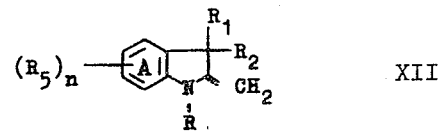

wherein
R, R$_1$, R$_2$, R$_5$, A and $n$ have the abovementioned meaning, under acid conditions.

Herein, the procedure followed is, for example, to heat a component of the formula (VII) and formic acid to the boil in an inert, water-immiscible solvent such as benzene, toluene or chlorobenzene until the water formed has been separated off azeotropically, to mix the resulting solution of a compound of the formula (XI) with the equivalent amount of an indolinemethylene compound of the formula (XII), to add an acid condensation agent such as phosphorus oxychloride, phosphorus pentoxide, polyphosphoric acid or sulphuric acid, and to carry out the condensation in the temperature range of 20° to 100°C.

Suitable indoleninemethylene compounds of the formula XII have already been mentioned above in the form of their ω-aldehydes of the formula VI.

The new dyestuffs of the formula I are valuable dyestuffs which can be used for dyeing and printing materials of leather, tannin-treated cotton, cellulose, synthetic high molecular polyamides and high molecular polyurethanes, and for dyeing fibres containing lignin, such as coir, jute and sisal. They are furthermore suitable for the manufacture of writing fluids, rubber stamp inks and ball pen pastes and can also be used in flexographic printing.

Materials which are particularly suitable for dyeing with the basic dyestuffs of the formula I are flocks, fibres, filaments, tapes, woven fabrics or knitted fabrics of polyacrylonitrile or polyvinylidene cyanide or of copolymers of acrylonitrile with other vinyl compounds, such as vinyl chloride, vinylidene chloride, vinyl fluoride, vinyl acetate, vinylpyridine, vinylimidazole, vinyl alcohol, acrylic and methacrylic acid esters and amides, or flocks, fibres, filaments, tapes, woven fabrics or knitted fabrics of acid-modified aromatic polyesters as well as acid-modified polyamide fibres. Acid-modified aromatic polyesters are, for example, polycondensation products of sulphoterephthalic acid and ethylene glycol, that is to say, polyethylene glycol terephthalates containing sulphonic acid groups (type Dacron 64 of E. I. DuPont de Nemours and Company), such as are described in Belgian Patent Specification No. 549,179 and U.S. Pat. No. 2,893,816.

Dyeing can be carried out from a weakly acid liquor, the material appropriately being introduced into the dye bath at 40° – 60°C and then dyed at the boil. Dyeing can also be carried out under pressure at temperatures above 100°C. Furthermore, the dyestuffs can be added to spinning solutions for the manufacture of fibres containing polyacrylonitrile or be applied to the unstretched fibre. The yellow to red dyeings on polyacrylonitrile, acid-modified polyesters and acid-modified polyamide are distinguished by very good fastness to light, wet processing, rubbing and sublimation and high affinity to the fibre. With anionic precipitants such as alumina, tannin and phosphotungstic and phosphomolybdic acids the dyestuffs form light-fast pigments, which can be used advantageously in paper printing.

The dyestuffs can be employed individually or as mixtures.

The dyestuffs according to the invention and their mixtures are well suited to dyeing shaped articles of polymers or copolymers of acrylonitrile, asymmetrical dicyanoethylene, acid-modified aromatic polyesters or acid-modified synthetic high molecular polyamides in chlorinated hydrocarbons as the dye bath, if the dyestuffs carry substituents which assist the solubility in chlorinated hydrocarbons such as, for example, the tertiary butyl group or the dodecyloxy group, or the anion X⁻ is the anion of a monobasic organic acid with 4–30 carbon atoms.

Stable concentrated solutions of these dyestuffs in chlorinated hydrocarbons can in particular be manufactured, optionally with the addition of polar organic solvents which are completely miscible with chlorinated hydrocarbons, such as butyrolactone, dimethylformamide, methanol, dioxane, acetonitrile, methyl ethyl ketone, nitrobenzene, dimethylsulphoxide, benzonitrile and 2-nitrochlorobenzene, if the dyestuffs according to the invention are in the form of salts of the monobasic organic acids with 4–30 carbon atoms which have been mentioned.

To manufacture such solutions, the dyestuffs according to the invention or their mixtures (in the form of the free bases or as salts of organic acids with 4–30 carbon atoms) are stirred with chlorinated hydrocarbons and monobasic organic acids with 4–30 carbon atoms, optionally with the addition of polar organic solvents which are completely miscible with chlorinated hydrocarbons and optionally at an elevated temperature.

EXAMPLE 1

230 ml of an aqueous formaldehyde solution are run into 590 ml of a 40% strength sodium bisulphite solution in water. The mixture is cooled to 40° and 282.8 g of 2-methylindoline are added whilst stirring. The heating bath is kept at 40° for 3 hours and the resulting clear solution is then poured into 1,200 g of ice water. Thereafter, 240 g of sodium bicarbonate are sprinkled in and a diazonium solution which was prepared from 231 g of p-toluidine, 800 ml of water and 430 g of concentrated hydrochloric acid is then added dropwise at 0° – 5°.

After stirring overnight, the azo dyestuff is salted out by stirring in 500 g of sodium chloride and 2 l of saturated sodium chloride solution and is squeezed out and rinsed with a little 23% strength sodium chloride solution. The moist press cake is dissolved in a mixture of 1 l of water and 1 l of concentrated ammonia solution at 40°, slowly heated to 95° under reflux cooling and then stirred for a further hour at 95°. The azo dyestuff is then filtered off and washed with hot water until neutral. It is dried in vacuo at 60°. Yield: 360 g of orange-coloured powder.

The product has the structure:

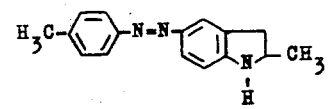

85.2 g of the azo dyestuff described above and 68.5 g of 1,3,3-trimethyl-2-methyleneindolin-ω-aldehyde are stirred into 145 g of xylene and 22 g of methanol under a nitrogen atmosphere. 19 g of phosphorus oxychloride are then added dropwise over the course of approx. 2.5 hours at approx. 10° – 15° and the mixture is stirred for a further 3 hours at 35°. 500 ml of water are then added and 35 g of sodium chloride are sprinkled in. The mixture is stirred for 3 hours and the resulting dyestuff is then separated from the solution. It has the formula

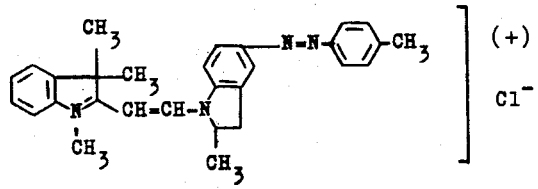

and dyes materials of polyacrylonitrile, acid-modified polyesters and acid-modified polyamide in golden yellow shades of excellent fastness to light and to wet processing.

If, following the above procedure, the coupling components, diazo components and aldehydes shown below are used instead of the "coupling component" 2-methylindoline, instead of the "diazo component" p-toluidine and instead of the aldehyde 1,3,3-trimethyl- 2-methyleneindolin-ω-aldehyde, further valuable dyestuffs are obtained, which dye polyacrylonitrile in the indicated colour shades:

| Coupling component | Diazo component | Aldehyde | Colour shade |
|---|---|---|---|
| 2-Methylindoline | m-toluidine | 1,3,3-trimethyl-2-methyleneindolin-ω-aldehyde | golden yellow |
| " | o-anisidine | " | " |
| " | m-anisidine | " | " |
| " | p-anisidine | " | " |
| " | o-phenetidine | " | " |
| " | p-phenetidine | " | " |
| " | 4-dodecyloxyaniline | " | " |
| " | 4-aminoacetanilide | " | " |
| " | N-benzoyl-p-phenylenediamine | " | " |
| " | 2,4-dimethoxyaniline | " | " |
| " | 2,5-dimethoxyaniline | " | " |
| " | 3,4-dimethoxyaniline | " | " |
| " | 3,4-diisopropoxyaniline | " | " |
| " | 2-chloro-4-aminoanisole | " | " |
| " | 2,4,5-trimethylaniline | " | " |
| " | 2,3,5-trimethylaniline | " | " |
| " | 5-amino-2-acetylaminoanisole | " | " |
| " | 6-amino-3-methoxy-toluene | " | " |
| 2-Methylindoline | 3,4-dicyanoaniline | 1,3,3-trimethyl-2-methylene-indolin-ω-aldehyde | golden yellow |
| " | p-sulphanilic acid amide | " | " |
| " | 4-chloroaniline | " | " |
| " | 4-fluoroaniline | " | " |
| " | 1,2,3,4-tetrahydro-5-amino-naphthalene | " | " |
| " | 4-amino-2,5-diethoxybenzoic acid anilide | " | " |
| " | 4-amino-2-methyl-5-methoxybenzanilide | " | " |
| " | 4-aminobenzamide | " | " |
| " | 4-cyclohexylaniline | " | " |
| " | 2,4-diethoxyaniline | " | " |
| " | 2-aminonaphthalene | " | " |
| " | p-tert.-butylaniline | " | " |
| " | p-n-propoxyaniline | " | " |
| " | p-n-butoxyaniline | " | " |
| " | p-i-propoxyaniline | " | " |
| " | 3-amino-phenyl-benzyl-ether | " | " |
| " | 2-amino-phenyl-benzyl-ether | " | " |
| 2-Methylindoline | 4-aminophenyl-p-methylbenzyl-ether | 1,3,3-trimethyl-2-methylene-indolin-ω-aldehyde | golden yellow |
| " | 4-aminophenyl-p-chlorobenzyl-ether | " | " |
| " | 4-aminophenyl-o-chlorobenzyl-ether | " | " |
| " | 4-aminophenyl-m,p-dichlorobenzyl-ether | " | " |
| " | 3-aminophenyl-p-methylbenzyl-ether | " | " |
| " | 3-aminophenyl-p-chlorobenzyl-ether | " | " |
| " | 3-aminophenyl-o-chlorobenzyl-ether | " | " |
| " | 3-aminophenyl-m,p-dichlorobenzyl-ether | " | " |
| " | 3-aminophenyl-p-methylbenzyl-ether | " | " |
| " | 2-aminophenyl-p-chlorobenzyl-ether | " | " |
| " | 2-aminophenyl-m,p-dichlorobenzyl-ether | " | " |
| " | 4-amino-2-methylphenyl-benzyl-ether | " | " |
| " | 5-amino-2-methylphenyl-benzyl-ether | " | " |
| " | 2-amino-5-methylphenyl-benzyl-ether | " | " |
| " | 4-amino-2-methoxy-phenyl-benzyl-ether | " | " |
| " | 4-amino-3-methoxy-phenyl-benzyl-ether | " | " |
| 2-Methylindoline | 4-amino-3-methylphenyl-benzyl-ether | 1,3,3-trimethyl-2-methylene-indolin-ω-aldehyde | golden yellow |
| " | 4-amino-3-chlorophenyl-benzyl-ether | " | " |
| " | 4-amino-2-chlorophenyl-benzyl-ether | " | " |
| " | 4-amino-2-methylphenyl-p-methyl-benzyl-ether | " | " |
| " | 4-amino-phenylbenzyl-ether | " | " |
| " | aniline | " | " |
| " | 5-amino-2-methylphenyl-m,p-dichloro-benzyl-ether | " | " |
| " | 4-amino-2-methoxy-phenyl-p-methyl-benzyl-ether | " | " |
| " | 2-amino-5-methylphenyl-p-chloro-benzyl-ether | " | " |
| " | 2-aminodiphenyl-ether | " | " |
| " | 4-aminodiphenyl-ether | " | " |
| " | 4-amino-4'-methyl-diphenyl-ether | " | " |
| " | 4-amino-4'-ethyl-diphenyl-ether | " | " |
| " | 4-amino-4'-tertiary butyl-diphenyl-ether | " | " |
| " | 4-amino-4'-cyclohexyl-diphenyl-ether | " | " |
| 2-Methylindoline | 4-amino-2'-methyl-diphenyl-ether | 1,3,3-trimethyl-2-methylene-indolin-ω-aldehyde | golden yellow |
| " | 4-amino-3'-methyl-diphenyl-ether | " | " |
| " | 4-amino-4'-methoxy-diphenyl-ether | " | " |
| " | 4-amino-3'-methoxy-diphenyl-ether | " | " |
| " | 4-amino-4'-ethoxy-diphenyl-ether | " | " |
| " | 4-amino-4'-acetylamino-diphenyl-ether | " | " |
| " | 4-amino-4'-hydroxy-diphenyl-ether | " | " |
| " | 4-amino-4'-nitro-diphenyl-ether | " | " |

-continued

| Coupling component | Diazo component | Aldehyde | Colour shade |
|---|---|---|---|
| " | 4-amino-4'-chloro-diphenyl-ether | " | " |
| " | 4-amino-2'-chloro-diphenyl-ether | " | " |
| " | 4-amino-3'-chloro-diphenyl-ether | " | " |
| " | 4-aminophenyl-α-naphthyl-ether | " | " |
| " | 4-aminophenyl-β-naphthyl-ether | " | " |
| " | 4-amino-2',3',5'-trimethyl-diphenyl- | " | " |
| " | 4-aminophenyl-4'-methyl-diphenyl-ether | " | " |
| " | 4-aminophenyl-4'-methoxy-diphenyl-ether | " | " |
| " | 4-aminodiphenylmethane | " | " |
| 2-Methylindoline | p-toluidine | 1,3,3-trimethyl-5-methyl-2-methylene-2,3-dihydro-indol-ω-aldehyde | golden yellow |
| " | " | 1,3,3-trimethyl-5-methoxy-2-methylene-2,3-dihydroindol-ω-aldehyde | " |
| " | " | 1,3,3-trimethyl-5-carbomethoxy-2-methylene-2,3-dihydroindol-ω-aldehyde | " |
| " | " | 1,3,3-trimethyl-5-carboethoxy-2-methylene-2,3-dihydroindol-ω-aldehyde | " |
| " | " | 1,3,3-trimethyl-5-cyclohexyl-2-methylene-2,3-dihydroindol-ω-aldehyde | |
| " | " | 1,3,3-trimethyl-5-benzyl-2-methylene-2,3-dihydroindol-ω-aldehyde | " |
| " | " | 1,3,3-trimethyl-5-nitro-2-methylene-2,3-dihydroindol-ω-aldehyde | orange |
| " | " | 1,3,3-trimethyl-7-methyl-2-methylene-2,3-dihyroindol-ω-aldehyde | golden yellow |
| " | " | 1,3,3-trimethyl-5-trifluoromethyl-2-methylene-2,3-dihydroindol-ω-aldehyde | " |
| " | " | 1,3,3-trimethyl-7-methoxy-2-methylene-2,3-dihydroindol-ω-aldehyde | " |
| " | " | 1,3,3-trimethyl-7-chloro-2-methylene-2,3-dihydroindol-ω-aldehyde | " |
| " | " | 1,3,3-trimethyl-5-benzyloxy-2-methylene-2,3-dihydroindol-ω-aldehyde | " |
| 2-Methylindoline | p-toluidine | 1,3,3-trimethyl-5-phenoxy-2-methylene-2,3-dihydroindol-ω-aldehyde | golden yellow |
| " | " | 1,3,3-trimethyl-7-benzyloxy-2-methylene-2,3-dihydroindol-ω-aldehyde | " |
| " | " | 1,3,3-trimethyl-7-phenoxy-2-methylene-2,3-dihydroindol-ω-aldehyde | " |
| " | " | 1,3,3-trimethyl-5-chloro-2-methylene-2,3-dihydroindol-ω-aldehyde | " |
| " | " | 1-ethyl-3,3-dimethyl-2-methylene-2,3-dihydroindol-ω-aldehyde | " |
| " | " | 1-ethyl-3,3-dimethyl-5-methyl-2-methylene-2,3-dihydroindol-ω-aldehyde | " |
| " | " | 1-ethyl-3,3-dimethyl-5-chloro-2-methylene-2,3-dihydroindol-ω-aldehyde | " |
| " | " | 1-ethyl-3,3-dimethyl-5-methoxy-2-methylene-2,3-dihydroindol-ω-aldehyde | " |
| " | " | 1-ethyl-3,3-dimethyl-5-carboethoxy-2-methylene-2,3-dihydroindol-ω-aldehyde | " |
| " | " | 1-ethyl-3,3-dimethyl-5-cyclohexyl-2-methylene-2,3-dihydroindol-ω-aldehyde | " |
| " | " | 1-ethyl-3,3-dimethyl-5-benzyl-2-methylene-2,3-dihydroindol-ω-aldehyde | " |
| " | " | 1-ethyl-3,3-dimethyl-5-nitro-2-methylene-2,3-dihydroindol-ω-aldehyde | orange |
| 2-Methylindoline | p-toluidine | 1,3,3-trimethyl-7-benzyl-2-methylene-2,3-dihydroindol-ω-aldehyde | golden yellow |
| " | " | 1,3,3-triethyl-2-methylene-2,3-dihydroindol-ω-aldehyde | " |
| " | " | 1-β-cyanoethyl-3,3-dimethyl-2-methylene-2,3-dihydroindol-ω-aldehyde | " |
| " | " | 1-β-chloroethyl-3,3-dimethyl-2-methylene-2,3-dihydroindol-ω-aldehyde | " |
| " | " | 1-n-butyl-3,3-dimethyl-2-methylene-2,3-dihydroindol-ω-aldehyde | " |
| " | " | 1-benzyl-3,3-dimethyl-2-methylene-2,3-dihydroindol-ω-aldehyde | orange |
| " | " | 1-allyl-3,3-dimethyl-2-methylene-2,3-dihydroindol-ω-aldehyde | golden yellow |
| " | " | mixture of: 1,3,3-trimethyl-4-methyl-2-methylene-2,3-dihydroindol-ω-aldehyde and 1,3,3-trimethyl-6-methyl-2-methylene-2,3-dihydroindol-ω-aldehyde | golden yellow |
| " | " | 1,3,3-trimethyl-6,7-benzo-2-methylene-2,3,3',4',5',6'-hexahydroindol-ω-aldehyde | orange |
| " | " | 1,3,3-trimethyl-5-fluoro-2-methylene-2,3-dihydroindol-ω-aldehyde | golden yellow |
| 2-Methylindoline | p-toluidine | 1,3,3-trimethyl-5-ethoxy-2-methylene-2,3-dihydroindol-ω-aldehyde | golden yellow |
| " | " | 1,3,3-trimethyl-7-ethoxy-2-methylene-2,3-dihydroindol-ω-aldehyde | " |
| " | " | 1,3,3-trimethyl-5-cyano-2-methylene-2,3-dihydroindol-ω-aldehyde | " |
| " | " | 1,3,3-trimethyl-5-acetylamino-2-methylene-dihydroindol-ω-aldehyde | " |
| " | " | 1,3,3-trimethyl-5-methylsulphonyl-2-methylene-2,3-dihydroindol-ω-aldehyde | " |
| " | " | 1,3,3-trimethyl-5-phenylsulphonyl-2-methylene-2,3- | |

-continued

| Coupling component | Diazo component | Aldehyde | Colour shade |
|---|---|---|---|
| " | " | dihydroindol-ω-aldehyde | " |
| " | " | 1,3-dimethyl-3-ethyl-2-methylene-2,3-dihydroindol-ω-aldehyde | " |
| " | " | mixture of 1,3,3-trimethyl-4-benzyloxy-2-methylene-2,3-dihydroindol-ω-aldehyde and 1,3,3-trimethyl-6-benzyloxy-2-methylene-2,3-dihydroindol-ω-aldehyde | golden yellow |
| " | " | 1,3,3-trimethyl-6,7-benzo-2-methylene-2,3-dihydroindol-ω-aldehyde | orange |
| " | " | 1,3,3-trimethyl-5-sulphonamido-2-methylene-2,3-dihydroindol-ω-aldehyde | golden yellow |
| " | " | 1,3,3-trimethyl-5-carbonamido-2-methylene-2,3-dihydroindol-ω-aldehyde | " |
| " | " | 1,3,3-trimethyl-5-carboxylic acid ethylanilide-2-methylene-2,3-dihydroindol-ω-aldehyde | " |
| 2-Methylindoline | p-toluidine | 1,3,3-trimethyl-7-ethyl-2-methylene-2,3-dihydroindol-ω-aldehyde | golden yellow |
| " | " | 1,3,3-trimethyl-5-chloro-7-methoxy-2-methylene-2,3-dihydroindol-ω-aldehyde | " |
| " | " | 1,3,3-trimethyl-4-chloro-7-methoxy-2-methylene-2,3-dihydroindol-ω-aldehyde | " |
| " | " | 1,3,3-trimethyl-4,5-dichloro-7-methoxy-2-methylene-2,3-dihydroindol-ω-aldehyde | " |
| " | " | 1,3,3-trimethyl-5-chloro-4,7-dimethoxy-2-methylene-2,3-dihydroindol-ω-aldehyde | " |
| " | " | 1,3,3-trimethyl-4,6-dicarbomethoxy-2-methylene-2,3-dihydroindol-ω-aldehyde | " |
| " | " | 1,3,3,4,5,7-hexamethyl-2-methylene-2,3-dihydroindol-ω-aldehyde | " |
| " | " | 1,3,3,4,6,7-hexamethyl-2-methylene-2,3-dihydroindol-ω-aldehyde | " |
| ". | " | 1,3,3-trimethyl-5-(o-chlorobenzyloxy)-2-methylene-2,3-dihydroindol-ω-aldehyde | " |
| " | " | 1,3,3-trimethyl-7-(p-chlorobenzyloxy)-2-methylene-2,3-dihydroindol-ω-aldehyde | " |
| " | " | 1,3,3-trimethyl-5-methyl-7-benzyloxy-2-methylene-2,3-dihydroindol-ω-aldehyde | " |
| " | " | mixture of 1,3,3-trimethyl-4-methoxy-5-benzyloxy-2-methylene-2,3-dihydroindol-ω-aldehyde and 1,3,3-trimethyl-6-methoxy-5-benzyloxy-2-methylene-2,3-dihydroindol-ω-aldehyde | golden yellow |
| 2-Methylindoline | p-toluidine | mixture of: 1,3,3-trimethyl-5-methyl-6-benzyloxy-2-methylene-2,3-dihydroindol-ω-aldehyde and 1,3,3-trimethyl-5-methyl-4-benzyloxy-2-methylene-2,3-dihydroindol-ω-aldehyde | " |
| " | " | 1,3,3-trimethyl-5-carboxy-2-methylene-2,3-dihydroindol-ω-aldehyde | " |
| " | " | 1,3,3-trimethyl-7-(p-methylbenzyloxy)-2-methylene-2,3-dihydroindol-ω-aldehyde | " |
| " | " | 1,3,3-trimethyl-7-(o-chlorobenzyloxy)-methylene-2,3-dihydroindol-ω-aldehyde | " |
| " | " | 1,3,3-trimethyl-5-benzyloxy-7-methyl-2-methylene-2,3-dihydroindol-ω-aldehyde | " |
| " | " | 1,3,3-trimethyl-5-methyl-7-(p-methylbenzyloxy)-2-methylene-2,3-dihydroindol-ω-aldehyde | " |
| " | " | 1,3,3-trimethyl-5-(4'-methylphenoxy)-2-methylene-2,3-dihydroindol-ω-aldehyde | " |
| " | " | 1,3,3-trimethyl-5-(4'-methoxyphenoxy)-2-methylene-2,3-dihydroindol-ω-aldehyde | " |
| 2-Methylindoline | p-toluidine | 1,3,3-trimethyl-7-(4'-methoxyphenoxy)-2-methylene-2,3-dihydroindol-ω-aldehyde | golden yellow |
| " | " | 1,3,3-trimethyl-5-(4'-chlorophenoxy)-2-methylene-2,3-dihydroindol-ω-aldehyde | " |
| " | " | 1,3,3-trimethyl-7-(3'-methylphenoxy)-2-methylene-2,3-dihydroindol-ω-aldehyde | " |
| " | " | 1,3,3-trimethyl-5-(3'-methoxyphenoxy)-2-methylene-2,3-dihydroindol-ω-aldehyde | " |
| " | " | 1,3,3-trimethyl-5-α-naphthyloxy-2-methylene-2,3-dihydroindol-ω-aldehyde | " |
| " | " | 1,3,3-trimethyl-5-(4'-ethylphenoxy)-2-methylene-2,3-dihydroindol-ω-aldehyde | " |
| 1,2,3,4-tetra-hydroquinoline | " | 1,3,3-trimethyl-2-methylene-indolin-ω-aldehyde | yellow |
| " | aniline | " | yellow |
| " | o-toluidine | " | reddish-yellow |
| " | o-anisidine | " | reddish-yellow |
| " | m-toluidine | " | yellow |
| " | m-anisidine | " | reddish-yellow |
| " | p-anisidine | " | " |
| " | o-phenetidine | " | " |
| " | p-phenetidine | " | " |
| 1,2,3,4-tetra-hydroquinoline | 4-chloroaniline | 1,3,3-trimethyl-2-methylene-indolin-ω-aldehyde | reddish-yellow |
| " | 2-chloroaniline | " | " |
| " | 2,6-dimethylaniline | " | yellow |
| " | 3,4-dimethoxyaniline | " | reddish-yellow |
| " | 2-chloro-5-methylaniline | " | " |
| " | 2-nitroaniline | " | golden yellow |

-continued

| Coupling component | Diazo component | Aldehyde | Colour shade |
|---|---|---|---|
| " | 2-chloro-4-nitroaniline | " | orange |
| " | 2-bromo-4-nitroaniline | " | " |
| " | 2-cyano-4-nitroaniline | " | " |
| " | 2-ethylsulphanyl-5-trifluoromethylaniline | " | golden yellow |
| " | 3-trifluoromethylaniline | " | reddish-yellow |
| " | 2-cyano-5-chloroaniline | " | golden yellow |
| " | 2,6-dichloro-4-nitroaniline | " | " |
| " | 3-chloro-4-nitroaniline | " | orange |
| " | 2-methoxy-4-nitroaniline | " | " |
| " | 2-methyl-4-nitroaniline | " | yellow |
| " | 4-fluoroaniline | " | golden yellow |
| 2,3,3-Trimethylindoline | p-toluidine | 1,3,3-trimethyl-2-methylene-indolin-ω-aldehyde | " |
| 1,2,3,4,4a,9a-Hexahydrocharbazole | " | " | " |
| 1,2,3,4-Tetrahydroquinoxaline | " | " | " |
| 2,3-Dihydro-4H-benzoxazine-(1,4) | " | " | reddish-yellow |
| 2,2,4-Trimethyl-1,2,3,4-tetrahydroquinoline | " | " | orange |
| 2,2,4-Trimethyl-1,2-dihydroquinoline | " | " | golden yellow |
| 2,3,3,6,7-Pentamethylindoline | " | " | " |
| 2,3,3,4,6-Pentamethylindoline | | | |
| Mixture of 2,3,3,4-tetramethylindoline and 2,3,3,6-tetramethylindoline | | | |
| Mixture of 2,3,3-trimethyl-4-trifluoromethyl-indoline and 2,3,3-trimethyl-6-trifluoromethyl-indoline | " | " | " |
| 2,3,3,4,6,7-Hexamethylindoline | " | " | " |
| 3-Hydroxy-7,8-benzo-1,2,3,4-tetrahydroquinoline | p-toluidine | 1,3,3-trimethyl-2-methylene-indolin-ω-aldehyde | golden yellow |
| 3-Hydroxy-1,2,3,4-tetrahydroquinoline | " | " | " |
| 2,3,3-Trimethyl-7-methylindoline | " | " | " |
| 2,3,3-Trimethyl-7-methoxyindoline | " | " | " |
| 2-Methylindoline | o-toluidine | " | " |
| " | 2,6-dimethylaniline | " | reddish-yellow |
| " | 4-aminobenzoic acid methyl ester | " | golden yellow |
| " | 2-chloroaniline | " | " |
| " | 2,4,5-trichloroaniline | " | orange |
| " | 2-fluoroaniline | " | golden yellow |
| " | 2-chloro-5-methyl-aniline | " | " |
| " | 2-chloro-6-methyl-aniline | " | " |
| " | 3-chloro-4-methyl-aniline | " | " |
| " | 3-chloro-2-methyl-aniline | " | " |
| 2-Methylindoline | 5-chloro-2-methylaniline | 1,3,3-trimethyl-2-methylene-indolin-ω-aldehyde | golden yellow |
| " | 4-chloro-3-methylaniline | " | " |
| " | 2,4-dichloro-5-methylaniline | " | orange |
| " | 2-nitroaniline | " | yellowish-orange |
| " | 2-methyl-5-nitroaniline | " | golden yellow |
| " | 2-methyl-3-nitroaniline | " | " |
| " | 2-methyl-4-nitroaniline | " | orange |
| " | 2-nitro-4-methoxyaniline | " | golden yellow |
| " | 2-methoxy-4-nitroaniline | " | orange |
| " | 2,5-dimethoxy-4-chloroaniline | " | " |
| " | 2,5-dimethoxy-4-nitroaniline | " | yellow-brown |
| " | 2-methoxy-4-nitro-5-methylaniline | " | orange |
| " | 2-chloro-4-nitroaniline | " | scarlet |
| " | 3-chloro-4-nitroaniline | " | golden yellow |
| " | 2-nitro-4-chloroaniline | " | " |
| " | 2-bromo-4-nitroaniline | " | scarlet |
| " | 2-methyl-4-nitro-5-chloroaniline | " | orange |
| " | 2,5-dichloro-4-nitroaniline | " | red |
| 2-Methylindoline | 2,6-dichloro-4-nitroaniline | 1,3,3-trimethyl-2-methylene-indolin-ω-aldehyde | yellow-brown |
| " | 2-cyano-5-chloroaniline | " | orange |
| " | 2-cyano-4-nitroaniline | " | red |
| " | 3-hydroxy-4-chloroaniline | " | golden yellow |
| " | 3-trifluoromethylaniline | " | " |
| " | 2-methylsulphonyl-4-nitroaniline | " | scarlet |
| " | 2-ethylsulphonyl-5-trifluoromethylaniline | " | orange |
| " | 4-aminobenzene | " | scarlet |
| " | 6-methyl-2-(-4-aminophenyl)-benzothiazole | " | orange |
| " | 2-chloro-5-trifluoromethylaniline | " | golden yellow |

EXAMPLE 2

If, analogously to the procedure indicated in Example 1, 2-methylindoline and aniline (instead of p-toluidine) are reacted with one another, the azo dyestuff of the formula

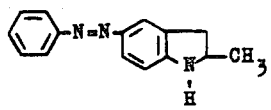

is obtained after hydrolysis.

20 g of this azo dyestuff are stirred with 17 g of 1,3,3-trimethyl-2-methylene-indolin-ω-aldehyde in 50 g of methanol. 7.9 g of 37% strength hydrochloric acid are added dropwise over the course of approx. 1 hour at about 35°C. The solution is then kept for 4 hours at 55° and thereafter 250 ml of 20% strength sodium chloride solution are added.

The resulting dyestuff is separated from the solution and dissolved in 800 ml of boiling water, the solution is clarified with 5 g of active charcoal and the dyestuff is then salted out with 80 g of sodium chloride. It dyes acid-modified synthetic fibres in golden yellow shades of excellent fastness properties and has the formula

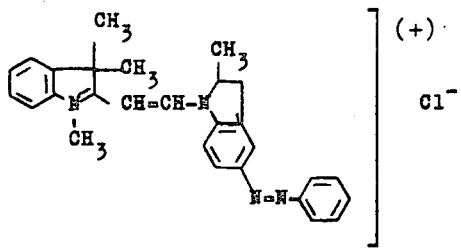

The product is identical with the dyestuff with "diazo component aniline" mentioned in the table accompanying Example 1.

EXAMPLE 3

20.1 parts by weight of 1,3,3-trimethyl-2-methylene-indolin-ω-aldehyde and 19.7 parts by weight of 4-aminoazobenzene are warmed for 3 hours with 150 parts by weight of glacial acetic acid on a boiling water bath. After the reaction mixture has cooled, it is poured out into 800 parts by volume of a 10% strength sodium chloride solution, the mixture is stirred overnight and the dyestuff which has separated out is filtered off, washed with 1,000 parts by volume of 10% strength sodium chloride solution and dried. The dyestuff thus obtained dyes fibre materials of polyacrylonitrile, acid-modified polyester and polyamide containing acid groups in a reddish-tinged yellow of outstanding fastness to light.

If instead of 4-aminoazobenzene the azo compounds listed in the table which follows are used and in other respects the same procedure is followed, very fast dyeings are again obtained, the colour shade of which is indicated in the table.

| Azo compound | Colour shade on polyacrylonitrile |
|---|---|
| 3,2'-Dimethyl-4-aminoazobenzene | reddish-tinged yellow |
| 2-Methoxy-4-aminoazobenzene | golden yellow |
| 2'-Methyl-4'-methoxy-4-aminoazobenzene | golden yellow |
| 2,2'-Dimethoxy-4-aminoazobenzene | orange |
| 2-Methoxy-2'-methyl-4-aminoazobenzene | golden yellow |

EXAMPLE 4

A polyacrylonitrile fabric is printed with a printing paste which was manufactured in the following manner:

330 parts by weight of hot water are poured over 30 parts by weight of the dyestuff described in Example 1, 50 parts by weight of thiodiethylene glycol, 30 parts by weight of cyclohexanol and 30 parts by weight of 30% strength acetic acid, and the resulting solution is added to 500 parts by weight of crystal gum (gum arabic as a thickener). Finally, 30 parts by weight of zinc nitrate solution are also added. The resulting print is dried, steamed for 30 minutes and subsequently rinsed. A golden yellow print of very good fastness properties is obtained.

EXAMPLE 5

Acid-modified polyglycol erephthalate fibres are introduced, using a liquor ratio of 1:40, into an aqueous bath at 20°C, which contains, per liter, 3 to 10 g of sodium sulphate, 0.1 to 1 g of oleyl polyglycol ether (50 mols of ethylene oxide), 0 – 15 g of dimethylbenzyl-dodecylammonium chloride and 0.15 g of the dyestuff described in terms of the formula in Example 1, and which has been adjusted to pH 4 to 5 with acetic acid. The bath is heated to 100°C over the course of 30 minutes and kept at this temperature for 60 minutes. Thereafter the fibres are rinsed and dried. A golden yellow dyeing of very good fastness properties is obtained.

EXAMPLE 6

Polyacrylonitrile fibres are introduced, using a liquor ratio of 1:40, into an aqueous bath at 40°C, which contains, per liter, 0.75 g of 30% strength acetic acid, 0.38 g of sodium acetate and 0.15 g of the dyestuff described in Example 1. The bath is heated to the boil over the course of 20–30 minutes and kept at this temperature for 30–60 minutes. After rinsing and drying, a golden yellow dyeing with very good fastness properties is obtained.

EXAMPLE 7

A stock solution is prepared from 15 parts by weight of the dyestuff mentioned in Example 1, 15 parts by weight of polyacrylonitrile and 70 parts by weight of dimethylformamide, which is added to a customary spinning solution of polyacrylonitrile, and the mixture is spun in a known manner. A golden yellow dyeing of very good fastness properties is obtained.

EXAMPLE 8

Acid-modified synthetic polyamide fibres are introduced, using a liquor ratio of 1:40, into an aqueous bath at 40° which contains, per liter, 10 g of sodium acetate, 1 to 5 g of oleyl polyglycol ether (50 mols of ethylene oxide) and 0.3 g of the dyestuff described in Example 1 and which has been adjusted to pH 4 – 5 with acetic acid. The bath is heated to 98° over the course of 30 minutes and kept at this temperature. Thereafter, the fibres are rinsed and dried. A golden yellow dyeing of very good fastness properties is obtained.

We claim:

1. Dyestuff of the formula

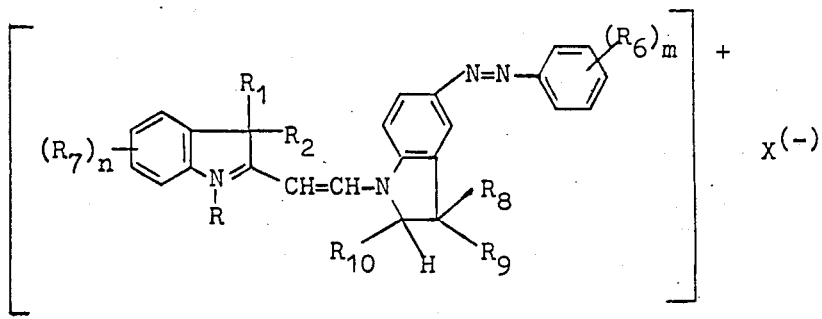

wherein

R denotes hydrogen, alkyl with 1–6 C-atoms, trifluoromethyl, chloroethyl, bromoethyl, hydroxyethyl, methoxyethyl, cyanoethyl, acetoxyethyl, aminocarbonylethyl, allyl, methallyl, chloroallyl, propargyl, phenyl, methylphenyl, chlorophenyl, naphthyl, benzyl, phenylethyl, or phenylpropyl-(2,2);

$R_1$ denotes alkyl with 1–6 C-atoms, trifluoromethyl, chloroethyl, bromoethyl, hydroxyethyl, methoxyethyl, cyanoethyl, acetoxyethyl, aminocarbonylethyl, allyl, methallyl, chloroallyl, propargyl, benzyl, phenylethyl or phenylpropyl-(2,2) or cyclohexyl;

$R_2$ denotes alkyl with 1–6 C-atoms, trifluoromethyl, chloroethyl, bromoethyl, hydroxyethyl, methoxyethoxy, cyanoethyl, acetoxyethyl, aminocarbonylethyl, allyl, methallyl, chloroallyl, propargyl, benzyl, phenylethyl, phenylpropyl-(2,2) or cyclohexyl;

$R_6$ and $R_7$ represent fluoro, chloro, bromo, $C_1$-$C_6$-alkyl, trifluoromethyl, chloroethyl, bromoethyl, hydroxyethyl, methoxyethyl, cyanoethyl, acetoxyethyl, aminocarbonylethyl, allyl, methallyl, chloroallyl, propargyl, cyclohexyl, benzyl, phenylethyl, phenylpropyl-(2,2), hydroxyl, alkoxy of 1–4 carbon atoms, phenyloxy, naphthyloxy, benzyloxy, phenylethyloxy, phenylpropyl-(2,2)-oxycarbonyl, cyano, amino, carbamoyl, N-$C_1$-$C_6$-alkylcarbamoyl, N,N-di-$C_1$-$C_6$-alkylcarbamoyl, N-$C_1$-$C_6$-alkyl-N-phenylcarbamoyl, N-$C_1$-$C_6$-alkyl-N-methylphenylcarbamoyl, N-$C_1$-$C_6$-alkyl-N-chlorophenylcarbamoyl, N-$C_1$-$C_6$-alkyl-N-naphthylcarbamoyl, sulphamoyl, N-$C_1$-$C_6$-alkylsulphamoyl, N,N-di-$C_1$-$C_6$-alkylsulphamoyl, $C_1$-$C_6$-alkylsulphonyl, phenylsulphonyl, methylphenylsulphonyl, chlorophenylsulphonyl, or naphthylsulphonyl;

$R_6$, in addition denotes phenylazo, methylphenylazo, chlorophenylazo, or naphthylazo;

$R_7$, in addition, denotes carboxyl;

$R_8$ and $R_9$ represent hydrogen, $C_1$-$C_6$-alkyl, trifluoromethyl, chloroethyl, bromoethyl, hydroxyethyl, methoxyethyl, cyanoethyl, acetoxyethyl, aminocarbonylethyl, allyl, methallyl, chloroallyl, benzyl, phenylethyl, phenylpropyl-(2,2), or propargyl;

$R_{10}$ represents hydrogen or $C_1$-$C_6$-alkyl;

$R_9$ and $R_{10}$ when joined together additionally represent a carbocyclic ring;

$m$ and $n$ represent the numbers 0, 1, 2, or 3; and $X^{(-)}$ represents an anion.

2. Dyestuff of the formula

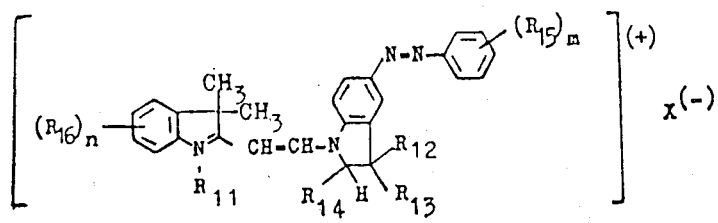

wherein $R_{11}$ denotes methyl, ethyl, n-propyl, i-propyl, n-butyl, β-chloroethyl, β-hydroxyethyl, β-cyanoethyl, β-methoxyethyl, β-bromoethyl, β-acetoxyethyl, allyl, or benzyl;

$R_{12}$ and $R_{13}$ denote hydrogen or methyl;

$R_{14}$ denotes methyl;

$R_{13}$ and $R_{14}$, additionally, when joined together represent n-butylene-1,4 when $R_{12}$ is hydrogen;

$R_{15}$ denotes fluoro, chloro, bromo, $C_1$-$C_4$-alkyl, cyclohexyl, hydroxyl, methoxy, ethoxy, phenoxy, benzyloxy, nitro, cyano, acetylamino, carbamoyl, sulphamoyl, methylsulphonyl, or trifluoromethyl;

$R_{16}$ denotes fluoro, chloro, bromo, $C_1$-$C_4$-alkyl, cyclohexyl, benzyl, methoxy, ethoxy, phenoxy, benzyloxy, nitro, methoxycarbonyl, benzyloxycarbonyl, carboxyl, cyano, acetylamino, amino, carbamoyl, sulphamoyl, methylsulphonyl or trifluoromethyl;

$m$ and $n$ denote the numbers 0, 1, 2, or 3; and $X^{(-)}$ denotes an anion.

3. Dyestuff of the formula

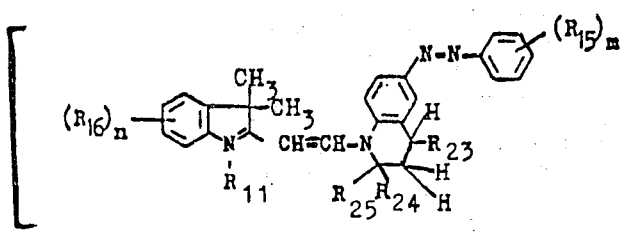

wherein
R$_{11}$ denotes methyl, ethyl, n-propyl, i-propyl, n-butyl, β-chloroethyl, β-hydroxyethyl, β-cyanoethyl, β-methoxyethyl, β-bromoethyl, β-acetoxyethyl, allyl, or benzyl;

R$_{15}$ denotes fluoro, chloro, bromo, C$_1$-C$_4$-alkyl, cyclohexyl, hydroxyl, methoxy, ethoxy, phenoxy, benzyloxy, nitro, cyano, acetylamino, carbamoyl, sulphamoyl, methylsulphonyl, or trifluoromethyl;

R$_{16}$ denotes fluoro, chloro, bromo, C$_1$-C$_4$-alkyl, cyclohexyl, benzyl, methoxy, ethoxy, phenoxy, benzyloxy, nitro, methoxycarbonyl, benzyloxycarbonyl, carboxyl, cyano, acetylamino, amino, carbamoyl, sulphamoyl, methylsulphonyl or trifluoromethyl;

R$_{23}$ denotes hydrogen or methyl,
R$_{24}$ denotes hydrogen or methyl and
R$_{25}$ denotes hydrogen or methyl,
m and n denote the numbers 0, 1, 2, or 3; and
X$^{(-)}$ denotes an anion.

4. Dyestuff of the formula

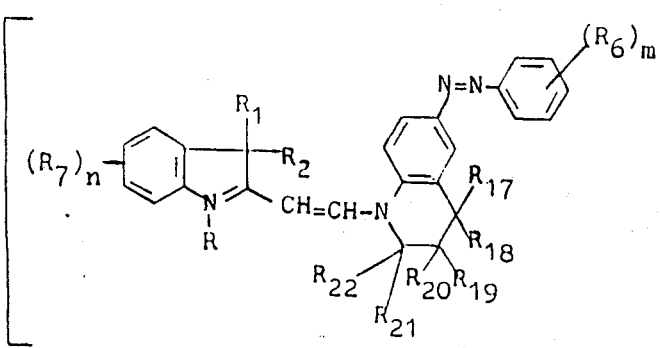

wherein
R denotes hydrogen, alkyl with 1–6 C-atoms, trifluoromethyl, chloroethyl, bromoethyl, hydroxyethyl, methoxyethyl, cyanoethyl, acetoxyethyl, aminocarbonylethyl, allyl, methallyl, chloroallyl propargyl, phenyl, methylphenyl, chlorophenyl, naphthyl, benzyl, phenylethyl, or phenylpropyl-(2,2);

R$_1$ denotes alkyl with 1–6 C-atoms, trifluoromethyl, chloroethyl, bromoethyl, hydroxyethyl, methoxyethyl, cyanoethyl, acetoxyethyl, aminocarbonylethyl, allyl, methallyl, chloroallyl, propargyl, benzyl, phenylethyl or phenylpropyl-(2,2) or cyclohexyl;

R$_2$ denotes alkyl with 1–6 C-atoms, trifluoromethyl, chloroethyl, bromoethyl, hydroxyethyl, methoxyethoxy, cyanoethyl, acetoxyethyl, aminocarbonylethyl, allyl, methallyl, chloroallyl, propargyl, benzyl, phenylethyl, phenylpropyl-(2,2) or cyclohexyl;

R$_6$ and R$_7$ represent fluoro, chloro, bromo, C$_1$-C$_6$-alkyl, trifluoromethyl, chloroethyl, bromoethyl, hydroxyethyl, methoxyethyl, cyanoethyl, acetoxyethyl, aminocarbonylethyl, allyl, methallyl, chloroallyl, propargyl, cyclohexyl, benzyl, phenylethyl, phenylpropyl-(2,2), hydroxyl, alkoxy of 1–4 carbon atoms, phenyloxy, naphthyloxy, benzyloxy, phenylethyloxy, phenylpropyl-(2,2) oxycarbonyl, cyano, amino, carbamoyl, N-C$_1$-C$_6$-alkylcarbamoyl, N,N-di-C$_1$-C$_6$-alkylcarbamoyl, N-C$_1$-C$_6$-alkyl-N-phenylcarbamoyl, N-C$_1$-C$_6$-alkyl-N-methylphenylcarbamoyl, N-C$_1$-C$_6$-alkyl-N-chlorophenylcarbamoyl, N-C$_1$-C$_6$-alkyl-N-naphthylcarbamoyl, sulphamoyl, N-C$_1$-C$_6$-alkylsulphamoyl, N,N-di-C$_1$-C$_6$-alkylsulphamoyl, C$_1$-C$_6$-alkylsulphonyl, phenylsulphonyl, methylphenylsulphonyl, chlorophenylsulphonyl, or naphthylsulphonyl;

R$_{17}$ represents hydrogen, hydroxyl, C$_1$-C$_6$-alkyl, C$_1$-C$_4$-alkoxy, fluoro, chloro, or bromo;
R$_{18}$ represents hydrogen or C$_1$-C$_6$-alkyl;
R$_{19}$ represents hydrogen, hydroxyl, C$_1$-C$_6$-alkyl, or C$_1$-C$_4$-alkoxy;
R$_{20}$ represents hydrogen or C$_1$-C$_6$-alkyl;
R$_{21}$ represents hydrogen, hydroxyl, C$_1$-C$_6$-alkyl,
R$_{22}$ represents hydrogen or C$_1$-C$_6$-alkyl,
R$_{18}$ and R$_{20}$ when joined together additionaly represent a direct bond;
m and n represent the numbers 0, 1, 2, or 3; and
X$^{(-)}$ represents an anion.

5. Dyestuff according to claim 1 of the formula

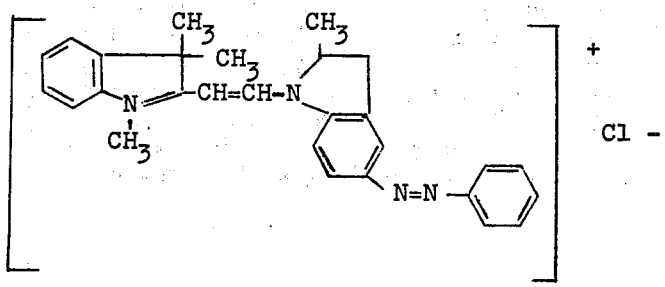

6. Dyestuff according to claim 1 of the formula
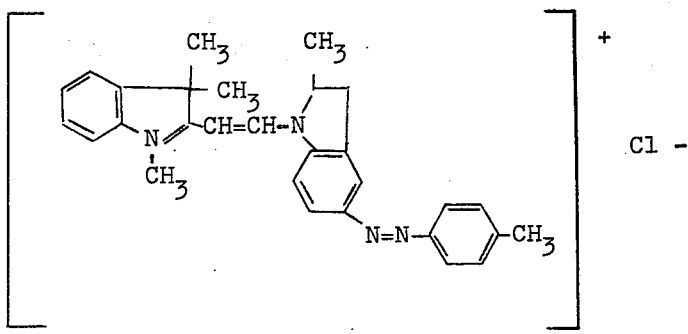
8. Dyestuff according to claim 4 of the formula
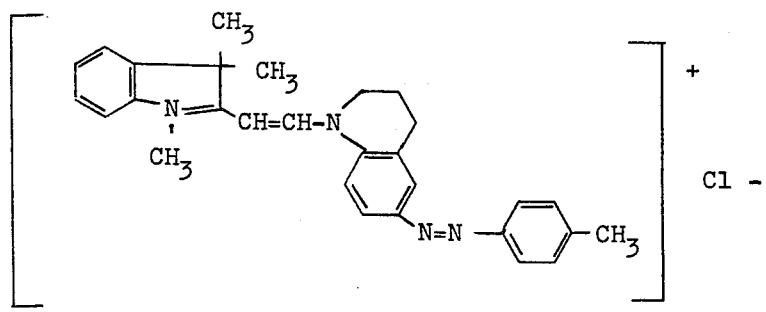
7. Dyestuff according to claim 4 of the formula
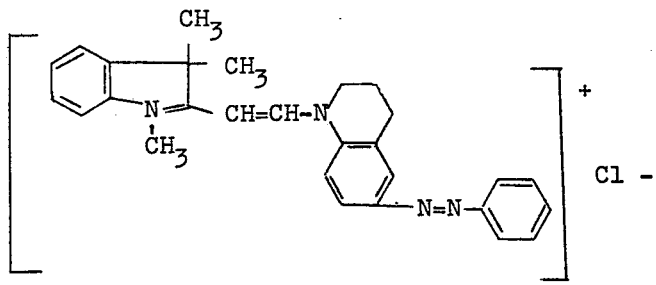
* * * * *